K. W. HEYMAN.
BALL BEARING.
APPLICATION FILED APR. 5, 1918.
1,269,436.
Patented June 11, 1918.
2 SHEETS—SHEET 2.
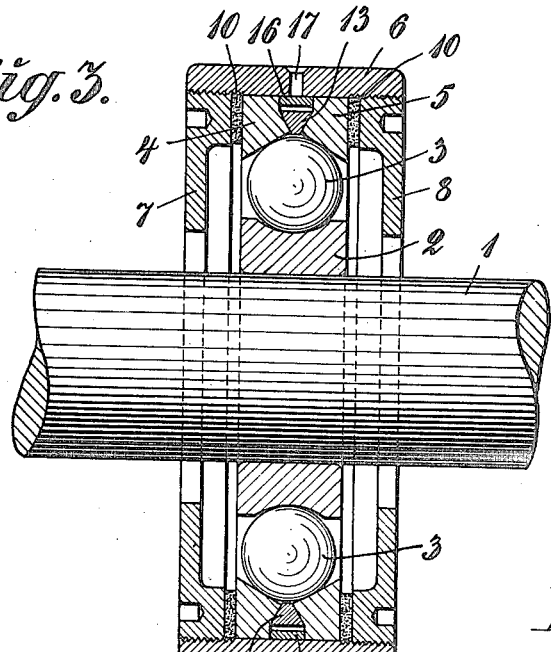
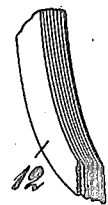
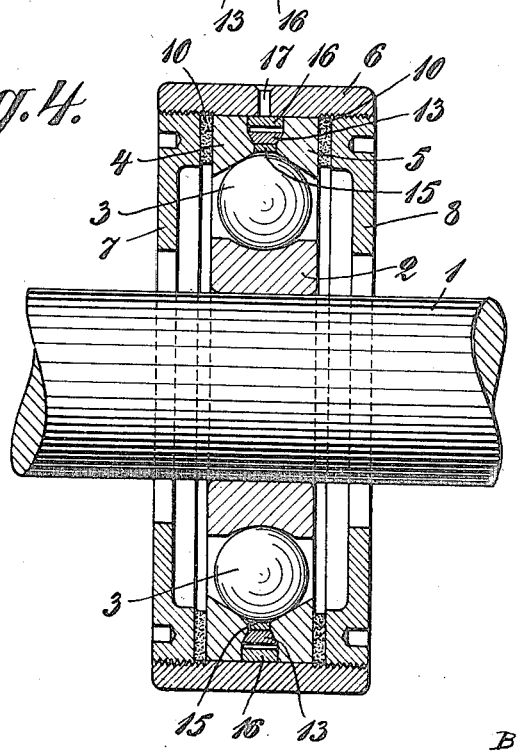
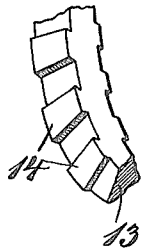
Inventor
K. W. Heyman
By H. R. Kerslake
Atty

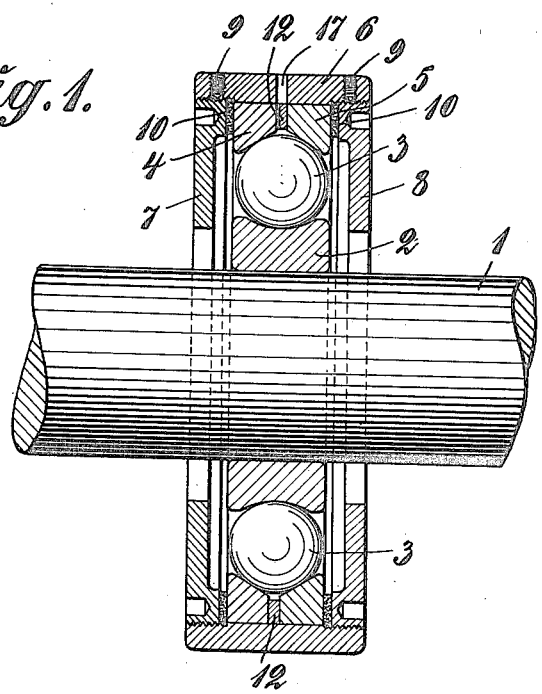
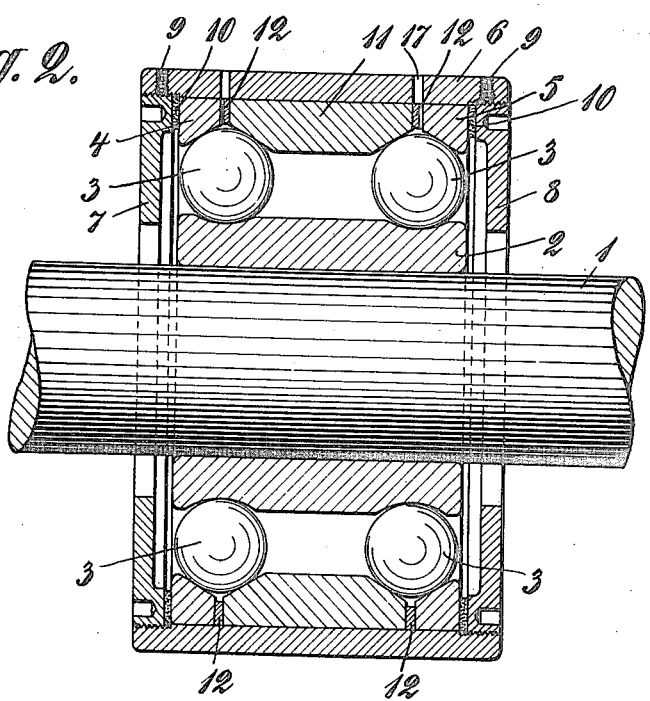

UNITED STATES PATENT OFFICE.

KNUT WALDEMAR HEYMAN, OF STOCKHOLM, SWEDEN.

BALL-BEARING.

1,269,436.  Specification of Letters Patent.  Patented June 11, 1918.

Application filed April 5, 1918. Serial No. 226,900.

*To all whom it may concern:*

Be it known that I, KNUT WALDEMAR HEYMAN, director, a subject of the King of Sweden, and resident of Brunkebergstorg 15, Stockholm, in the Kingdom of Sweden, have invented certain new and useful Improvements in Ball-Bearings, of which the following is a specification, reference being made to the accompanying drawings.

The present invention relates to that kind of ball bearings which have the rolling surface, on which rolls the outer circumference of the row of balls, divided into two parts, one on either side of the row of balls, and the said parts surrounded by a support common to both of them and serving as a frame for side-pieces supporting said parts laterally. The invention is characterized principally thereby that between one or each of the said parts and the corresponding side-piece is placed a packing of elastic material, for instance leather, felting or the like, in order that the said parts, when subjected to shocks to which the bearing may be exposed, can, for the moment, be pushed apart from, and again approached to one another, whereby the surfaces of the bearing as well as the balls will be spared.

The pressure of the elastic material acting on the said parts should as a rule be so adjusted that the pressure of the balls in the row of balls, under normal conditions, will not overcome the elastic pressure acting on the parts, and move these latter apart from one another, but that, on the other hand, an increased pressure from the balls, or a temporary pressure from the latter which is greater than that prevailing under normal conditions, presses the two parts with the ball-races a little apart from one another, whereupon the parts, when the temporary pressure ceases, are returned by the elastic pressure toward one another. The movement which the parts thus perform should preferably be such that the parts are displaced parallel to one another. In their normal position the parts, in accordance with the present invention, are kept at some distance from one another, and in the space between them is placed a packing of such thickness that when the parts rest against it, they are adjusted in their proper position in relation to the balls. In some ball bearings this packing need only be in the form of a plane ring of suitable thickness. In certain other ball bearings of this kind, on the other hand, the disadvantage may arise, that the parts by the temporary higher pressure may be moved farther apart from one another at that point of their circumference where they are subjected to the higher pressure, than at other points of their circumference, in consequence whereof the parts in relation to one another sometimes assume a slanting or tilted position, which obviously will result in an unfavorable effect on the running of the bearing. In order that such a disadvantage may not arise, the packing between the parts is, in accordance with the present invention, made wedge-shaped in cross section and so arranged that when the row of balls at one point is pressed in a direction outward from the center of the bearing and thereby move the ball-races apart, the balls almost simultaneously therewith impinge upon the packing and displace it at this point away from the center, which has the result that the packing at the diametrically opposite point is approached to the center, and thus, if the sides of the wedge-shaped packing are given the proper inclination, separates the parts of this latter point to an equal extent as at the point where they are separated by the balls.

The accompanying drawings illustrate by way of example some forms of ball bearings shown in cross section and arranged in accordance with the present invention. In Figures 1 and 2 are shown ball bearings in which the parts, with the ball races for the balls, are separated by means of a plane ring, while Figs. 3 and 4 illustrate a ball bearing where said parts are separated by means of a ring wedge-shaped in cross section. Figs. 5 and 6 show details.

With reference to Fig. 1, 1 is the shaft provided with the inner ring 2, on which roll the balls 3 of the ball bearing. The outer ring of the said bearing is divided into two parts 4 and 5, each of which has the side, facing the balls, of such a shape that the balls are retained in their track and suitable rolling surfaces are obtained. The two ring parts are surrounded by a ring or hoop 6 serving as a support, which hoop extends so far beyond each of the two ring parts, that it can serve as an attachment for a member, for instance a plate or a ring 7 and 8 respectively, retaining the adjacent ring in its place, resting against the row of balls. The rings 7 and 8 are preferably threaded in the hoop 6, so that, when rotated, they can be caused to rest with a suitable pressure against the adjacent part, whereupon each of them with the aid of a set-screw 9, or the like, can be kept in its adjusted position. In order that the pressure with which the rings 7 and 8 rest against their adjacent parts may be yielding, there is arranged between one or each of the rings 7, 8 and the opposite part, a yielding packing 10 of some elastic material, for instance leather, felt, or the like, so that when the bearing is subjected to a shock, the parts with the ball-races can move a little apart from one another, and immediately afterward be again approached to one another, by the action of the elastic packing and assume the original position.

The form shown in Fig. 2 differs from the form just described merely therein that the invention has been applied to a ball bearing with two rows of balls. The inner ring 2 placed on the shaft 1 is provided with two tracks for balls 3, and the outer ring is divided into three parts, of which the two outer parts 4 and 5 are arranged as the corresponding parts in Fig. 1, with rings 7, 8 acting upon the same, a packing 10 and set-screws 9, while the intermediate ring 11 is furnished with two ball-races, one for each of the two rows of balls.

The ring 11, if so desired, may also be divided into two parts, and between its two parts may be arranged a suitable elastic packing.

It is obvious that ball bearings with a greater number of rows of balls can be arranged in a similar manner.

In the space between the two parts 4 and 5 of the ring it is in certain cases suitable to arrange a packing 12 of such thickness that when the parts are pushed, by the members acting upon the same, against said packing, they are at the same time adjusted in their proper position in relation to the balls.

This packing may suitably be composed of thin lamina, Fig. 5, whereby is attained the advantage that, when the ball-races of the ring parts have become worn, and the ring parts consequently need to be approached somewhat to, or carried apart from one another, this may easily be effected by increasing or diminishing the number of lamina, instead of, if the packing consists of a solid ring, either exchanging it for a new thicker or thinner one which requires to be ground before insertion, or else to grind the previously used packing somewhat thinner.

The forms shown in Figs. 3 and 4 are similar to those above described, with the exception that the packing placed between the ring parts 4 and 5 consists of a ring 13, that is wedge-shaped in cross section, in lieu of the plane ring above referred to, and that the surfaces of the ring parts 4 and 5 which rest against this packing have been given a corresponding shape. This packing 13 has the wedge so placed that the thin end of the wedge is directed inward toward the center of the bearing. The sides of the ring parts 4 and 5, facing the packing, have the same inclination as the sides of the wedge, and rest against the said sides in consequence of the elastic pressures acting on the ring parts. When all the parts assume a normal position, the thin end of the wedge-shaped packing does not reach quite up to the row of balls, but is in its immediate vicinity. Consequently the balls, so long as the parts are in the normal position, roll only against the ball-races of the parts 4 and 5, but immediately impinge upon the packing, as soon as the balls, for some momentary reason, are able to move the parts 4 and 5 apart from one another, in which case the packing 13, by the pressure from the balls at that place where said pressure is acting, is pushed outward in a direction away from the center of the bearing. This displacement at this point of the ring-shaped packing 13 obviously has the result that the packing, at the diametrically opposite point, approaches the center of the bearing, whereby the packing, as is readily understood, in consequence of its wedge-shape, here presses the parts 4 and 5 apart from one another, and thereby compels the same to move parallel to one another, so that they can afterward by the elastic pressure acting upon the same, easily return to their normal position.

It is obviously of importance that the inclined surfaces, which form the wedge on the packing 13, as well as the surfaces of the parts 4 and 5 resting against the same, should be accurately executed and fit well to one another. The work in making this fit and the necessary grinding for that purpose can be diminished to some extent by providing the one of two such surfaces, resting against one another, with a number of comparatively low lugs 14 (Fig. 6), whereby only the said lugs need be worked and the intermediate spaces may be left untouched.

In addition to the two side surfaces of the packing 13, just referred to, also that surface of the same which faces the balls 3 must be accurately worked, in order that it may, along its entire circumference, be in the immediate vicinity of the balls, when the parts assume their normal positions. This last-named surface may, if so desired, be arranged on a separate ring-shaped part 15, as shown in Fig. 4. This part 15, which in cross section may be rectangular, must on its outer circumference be in contact with the wedge-shaped packing 13. One of the surfaces of these parts facing one another may consist of lugs projecting from the said part, arranged similarly to the lugs 14, in order to diminish the work on said surfaces. By the arrangement of the part 15 there is attained, the advantage that only this part need be substituted for a new one, in case its surface, facing the balls, should be so worn, by the latter that an exchange is required, whereas the wedge-shaped part 13, which is more difficult to make, still can be used.

In order that, on the one hand, the parts 4 and 5 may be able readily to assume their proper positions in the bearing, and that, on the other hand, the elastic packings 10 may be unable to press them too hard against the wedge-shaped packing, there is fixed around the outside of the latter, and at a suitable distance from the same, a support 16, which may either be in one piece, passing around the wedge-shaped packing 13, or divided into a number of parts placed at a suitable distance from one another.

Communicating with the space between the ring parts 4 and 5, there may be arranged in the hoop 6 at some suitable place on its circumference an oil-hole 17 for the lubrication of the bearing. If between the ring parts there is a packing without appertaining lugs 14, there should be arranged in said packing a slit or groove opposite the oil-hole for conducting the lubricating material to the balls.

It is evident that a bearing arranged in accordance with the present invention possesses several advantages. Thus for instance, when being worn, it can, by bringing the ring parts 4 and 5 in corresponding degree closer together be made to act again as a new bearing. Moreover, the device permits of cheaper manufacture and easier putting together.

Having now described my invention, what I claim as new and desire to secure by Letters Patent is:

1. In a ball bearing, a race element formed of two members having complementary surfaces for engaging the balls, and resilient means bearing against one of said members to permit the same to move away from the other member when the balls are forced against the complementary surfaces with sufficient force.

2. In a ball bearing, a race element formed of two members having complementary surfaces for engaging the balls, and resilient means bearing against said members to permit the same to move apart when the balls are forced against the complementary surfaces with sufficient force.

3. In a ball bearing, a race element formed of two members having complementary surfaces for engaging the balls, a housing, and resilient means located between said housing and one of said members to permit said member to move away from the other member when the balls are forced against the complementary surfaces with sufficient force.

4. In a ball bearing, a race element formed of two members having complementary inclined faces for engaging the balls, resilient means bearing against one of said members to permit the same to move away from the other member when the balls are forced against the inclined faces with sufficient force, and means located between said members for limiting the movement of the balls.

5. In a ball bearing, a race element formed of a plurality of rings having complementary surfaces for engaging the balls, and resilient means bearing against one of said rings to permit the same to move away from the other ring when the balls are forced against the complementary surfaces with sufficient force.

6. In a ball bearing, a race element formed of a plurality of rings having complementary inclined faces for engaging the balls, resilient means bearing against one of said rings to permit the same to move away from the other ring when the balls are forced against the complementary faces with sufficient force, and a ring located between rings for limiting the movement of the balls.

7. In a ball bearing, a race element formed of a plurality of rings having complementary inclined faces for engaging the balls, resilient means bearing against one of said rings to permit the same to move away from the other ring when the balls are forced against the complementary faces with sufficient force, and a ring, wedge-shaped in cross section, located between said rings and adapted when engaged at one point by the balls to move its diametrically opposite point inwardly for uniformly moving the other rings apart.

8. In a ball bearing, a race element formed of a plurality of rings having complementary inclined faces for engaging the balls, resilient means bearing against one of said rings to permit the same to move away from the other ring when the balls are forced against the complementary faces with sufficient force, a ring, wedge-shaped in cross section, located between said rings, and a bearing ring located between the wedge-shaped ring and the balls.

9. In a ball bearing, a race element formed of a plurality of rings having complementary inclined faces for engaging the balls, resilient means bearing against one of said rings to permit the same to move away from the other ring when the balls are forced against the complementary faces with sufficient force, and a ring, wedge-shaped in cross section located between said rings and provided on its lateral edges with spaced lugs.

10. A ball bearing comprising a hoop, a race element located in said hoop and comprising a plurality of rings having complementary inclined faces adapted to engage the balls, members for preventing the rings from leaving the hoop, and resilient packings located between said last named means and the rings.

In witness whereof I have hereunto set my hand in presence of two witnesses.

KNUT WALDEMAR HEYMAN.

Witnesses:
    CARL TH. SUNDHOLM,
    JACOB BAGGE.